(12) United States Patent
Schwartz et al.

(10) Patent No.: US 9,488,286 B2
(45) Date of Patent: Nov. 8, 2016

(54) SINGLE PIECE THREE-WAY ELASTOMERIC VALVE

(71) Applicant: ECOLAB USA INC., St. Paul, MN (US)

(72) Inventors: Daniel Ronald Schwartz, Hopkins, MN (US); Andrew Max Schultz, Minneapolis, MN (US)

(73) Assignee: ECOLAB USA INC., St. Paul, MN (US)

( * ) Notice: Subject to any disclaimer, the term of this patent is extended or adjusted under 35 U.S.C. 154(b) by 232 days.

(21) Appl. No.: 14/061,817

(22) Filed: Oct. 24, 2013

(65) Prior Publication Data

US 2015/0114475 A1    Apr. 30, 2015

(51) Int. Cl.
*F16K 11/044* (2006.01)
*B01F 1/00* (2006.01)
*A47K 5/00* (2006.01)

(52) U.S. Cl.
CPC ........... *F16K 11/044* (2013.01); *B01F 1/0027* (2013.01); *Y10T 137/0324* (2015.04); *Y10T 137/4891* (2015.04); *Y10T 137/86574* (2015.04)

(58) Field of Classification Search
CPC ..................................................... F16K 11/044
USPC ......................................................... 422/261
See application file for complete search history.

(56) References Cited

U.S. PATENT DOCUMENTS

| | | |
|---|---|---|
| 5,409,144 A | 4/1995 | Brown |
| 7,128,245 B2 | 10/2006 | Lee |
| D563,221 S | 3/2008 | Ashiwa et al. |
| 8,397,956 B2 | 3/2013 | Olechowski |

(Continued)

FOREIGN PATENT DOCUMENTS

| | | |
|---|---|---|
| EP | 0 816 245 A1 | 1/1998 |
| EP | 0 816 245 B1 | 1/1998 |
| EP | 1 958 883 B1 | 8/2008 |

(Continued)

OTHER PUBLICATIONS

EP 0 816 245 A1—L'Oreal—English Translation.
EP 0 816 245 B1—L'Oreal—English Translation.

*Primary Examiner* — Kevin Joyner
*Assistant Examiner* — Holly Mull
(74) *Attorney, Agent, or Firm* — McKee, Voorhees and Sease, PLC

(57) ABSTRACT

A drainage component in fluid communication with the fluid supply line includes a drain channel leading to a drain, the drain channel having an inner wall and an outer wall. The inner wall has a sealing surface approximate a three-way elastomeric valve. The elastomeric valve includes a moveable first wall having a first position when the fluid supply is on and a second position when fluid supply is off and a second wall connected to the moveable first wall, the second wall engaging a drain sealing surface when the first wall is in the first position. The elastomeric valve includes an orifice through which fluid may flow. When the pressure of the fluid on the elastomeric element increases, the second wall of the elastomeric valve engages the drain sealing surface. The elastomeric valve is preferably a fluoroelastomer to ensure both flexibility and resistance to a variety of chemical products.

15 Claims, 13 Drawing Sheets

(56) References Cited

U.S. PATENT DOCUMENTS

| | | | |
|---|---|---|---|
| 2008/0035677 A1* | 2/2008 | Daansen | B05B 11/007 222/310 |
| 2008/0237271 A1* | 10/2008 | Olechowski | B65D 47/2031 222/494 |
| 2009/0302073 A1* | 12/2009 | McKeown | A47K 5/122 222/571 |
| 2013/0216450 A1* | 8/2013 | Carroll | B01F 5/02 422/261 |

FOREIGN PATENT DOCUMENTS

| | | |
|---|---|---|
| EP | 1 958 883 B8 | 8/2008 |
| EP | 958 883 A1 | 8/2008 |

* cited by examiner

SINGLE PIECE THREE-WAY ELASTOMERIC VALVE

FIELD OF THE INVENTION

The present invention relates generally to an apparatus, method and system for cleaning and sanitizing using solid chemistry products. More particularly, but not exclusively, the present invention relates to a system, method and apparatus for removing excess solution.

BACKGROUND OF THE INVENTION

Solutions for cleaning and sanitizing are preferably dispensed to a user in a controlled setting. Typically a dispenser is configured to hold a solid product chemistry that is combined with a fluid, such as water, to create the desired solution. For example, the solid product chemistry may be mixed with the fluid to create a cleaning detergent. The dispenser works by having the fluid interact with the solid product to form a solution having a desired concentration for its end use application. The fluid may be introduced to the bottom or other surface of the solid product chemistry. The solid product chemistry is typically located on a diffuse manifold which is generally made of plastic and sometimes referred to as a puck. The puck may have a series of holes in a specific pattern used to achieve a pressure and flow rate which results in a desired solution concentration.

The introduction and interaction of the fluid with the solid product chemistry to form the desired solution concentration can also be done in a number of ways. For example, spraying fluid onto the solid product chemistry to dissolve it into a fluid solution is one technique. Another technique is to fill a pool of fluid to dissolve the desired amount of solid product chemistry before draining for use. A combination of these techniques may also be used. Preferably, a turbulent bath of water is created to aid in dissolving the desired amount of the solid product chemistry. Changes in characteristics of the fluid or environment may create problems with the concentration and erosion rate of the solid product chemistry. Additionally, stagnant water remaining after use can also cause issues. It is therefore desirable to remove as much excess solution from the area inside the puck as possible after use.

When not in use, excess solution may also remain in other areas of the dispenser. When this excess solution remains standing for prolonged periods of time, there is an increased risk of scaling as well as unwanted microbial growth. Additionally, some components of the dispenser may be more sensitive to chemical compatibility. For example, it is desirable to protect the backflow prevention device from contact with the solution. It is therefore desirable to quickly remove as much excess solution as possible after use both upstream and downstream from the solid product chemistry.

One way to remove excess solution is to do so automatically. Current apparatuses, methods and systems that automatically remove excess solution have long drainage times. Long drainage times negatively impact the consumer experience. These long drainage times can be caused by systems that have a relatively large footprint in the dispenser.

Current ways to evacuate a dispenser after the inlet fluid is turned off include floats, balls or umbrella valves. These systems are typically large relative to the surrounding components. They are also typically complex, making manufacturing and installation both difficult and expensive. It is therefore desirable to have a small footprint system to drain excess solution which is easier to manufacture and lower in cost.

Current small footprint valves typically operate by opening upon the application of pressure. For example, as shown in Publication EP1958883B8 filed by Avesto Tech B.V., a typical dispensing valve may have a flexible membrane which is deformable from a closed position to an open, dispensing position upon application of pressure to the fluid in the container. While such a valve may work for dispensing applications, its typically closed position is counter to the operation of a drain, which preferably has a typically open position. It is therefore desirable to have a system, apparatus and method that will have a small footprint, but work in drainage systems.

Therefore, there exists a need in the art for an apparatus, method and system for draining excess solution which addresses these problems.

SUMMARY OF THE INVENTION

Therefore, it is principal object, feature, and/or advantage of the present invention to provide an apparatus that overcomes the deficiencies in the art.

It is another object, feature, and/or advantage of the present invention to provide an apparatus, system and method to drain solution from the dispenser supply lines.

It is yet another object, feature, and/or advantage of the present invention to provide an apparatus, system and method to drain solution from the dispenser supply lines which is efficient and removes as much excess solution as possible.

It is still another object, feature, and/or advantage of the present invention to provide an apparatus, system and method to drain solution from the dispenser supply lines which works automatically.

It is a further object, feature, and/or advantage of the present invention to provide an apparatus, system and method to drain solution from the dispenser supply lines quickly.

It is still a further object, feature, and/or advantage of the present invention to provide an apparatus, system and method to drain solution from the dispenser supply lines in a small footprint relative to the other components in the dispenser.

It is yet a further object, feature, and/or advantage of the present invention to provide an apparatus, system and method to drain solution from the dispenser supply lines which is easier to manufacture than today's systems.

It is another object, feature, and/or advantage of the present invention to provide an apparatus, system and method to drain solution from the dispenser supply lines which is lower in cost than today's systems.

These and/or other objects, features, and advantages of the present invention will be apparent to those skilled in the art. The present invention is not to be limited to or by these objects, features and advantages. No single embodiment need provide each and every object, feature, or advantage.

According to an embodiment of the invention, an apparatus for controlling the flow of a fluid is provided. The apparatus includes a fluid supply source and a fluid supply line in communication with the fluid supply source. The fluid supply through the fluid supply line can be turned on and off. The fluid supply line is operatively connected to a downstream supply line.

A single piece three-way elastomeric valve secured ahead of the downstream supply line, the elastomeric valve preferably includes a moveable first wall, the moveable first wall having a first position when the fluid supply is on and a second position when fluid supply is off. The elastomeric valve also includes a second wall connected to the moveable first wall, the second wall engaging a drain sealing surface when the first wall is in the first position.

The single piece three-way elastomeric valve preferably also includes an outer flange portion, an inner face portion and a hinge portion between the outer flange portion and the inner face portion. The inner face portion includes a front surface, a rear surface and a wall extending downstream from the rear surface of the inner face portion. The wall may be in the shape of a ring, may be a portion of a ring, in sections or otherwise shaped as desired, so long as the wall is capable of forming a seal with the drain sealing surface.

A drain is included where the drain is only in fluid communication with the downstream supply line when the moveable first wall of the elastomeric valve is in the second position. The drain preferably is a plurality of open holes located in a drainage component, but may be a single hole sized appropriately to accommodate the desired drainage. The drain may be formed in the downstream supply line, the fluid supply line or in a separate drainage component which is then secured between the fluid supply line and the downstream supply line.

In this manner a method of controlling the flow of fluid to a solid product chemistry is provided. Generally, the method includes turning on a supply of fluid to a fluid supply line. The pressure created by the flow of fluid on the elastomeric valve deforms the elastomeric valve secured between an upstream portion of the fluid supply line and a downstream portion of the fluid supply line, the deformation of the elastomeric valve thereby sealing a drainage path. By turning off the supply of fluid to the fluid supply line, the drainage path is opened by allowing the elastomeric valve to return to its original position and thus draining excess fluid from the downstream portion of the fluid supply line as well as the upstream portion up to the backflow prevention divide. By evacuating the upstream portion to the backflow device, the present invention protects the flow control device by minimizing potential for exposure to any chemistry solution and thereby minimizing the need to worry about chemical compatibility with such parts.

To further minimize costs, the fluid supply line is preferably assembled by securing the upstream portion of the fluid supply line to a first side of a drainage component and securing the downstream portion of the fluid supply line to a second side of a drainage component. The elastomeric valve is preferably inserted into the drainage component prior to assembling a fluid supply line. Preferably, the elastomeric valve centers itself upon insertion into the drainage component.

The apparatus accomplishing this method can be incorporated into a dispensing system. For example, a dispenser according to the present invention preferably includes a dispenser housing, a fluid inlet connected to a fluid supply source, a product support grate, a solid product chemistry supported on the product support grate and a fluid supply line. The fluid supply line preferably includes an upstream portion in communication with the fluid inlet and a downstream portion directing fluid towards the solid product chemistry. The fluid supply through the fluid supply line can be turned on or off.

A drainage component is in fluid communication with the fluid supply line and preferably includes a drain channel leading to a drain, the drain channel defined by an inner wall and an outer wall. The inner wall preferably has a sealing surface approximate a single piece three-way elastomeric valve. A preferred embodiment of the elastomeric valve includes a moveable first wall, the moveable first wall having a first position when the fluid supply is on and a second position when fluid supply is off and a second wall connected to the moveable first wall, the second wall engaging a drain sealing surface when the first wall is in the first position.

The elastomeric valve includes an orifice through which fluid may flow. When the pressure of the fluid on the elastomeric element increases, the second wall of the elastomeric valve engages the drain sealing surface. Generally, the orifice is circular, but preferably also includes radially extending slots. The elastomeric valve is preferably a fluoroelastomer to ensure both flexibility and resistance to a variety of chemical products.

DETAILED DESCRIPTION OF THE PREFERRED EMBODIMENTS

Figure 1:
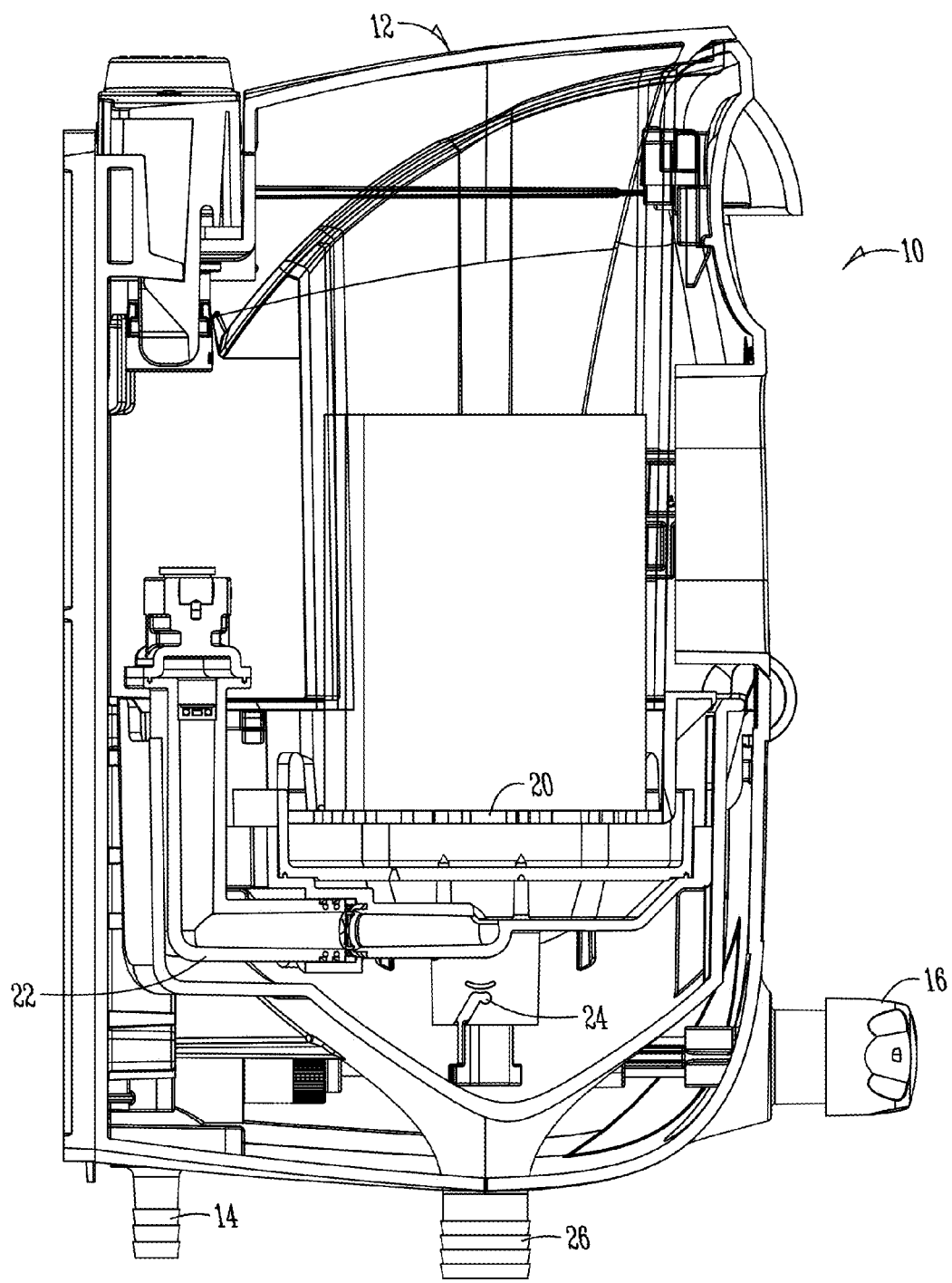
FIG. 1 is a cross-sectional view of an embodiment of a dispenser.

FIG. 1 shows an exemplary embodiment of a dispenser 10 for use with the present invention. However, it should be noted that other types and configurations of dispensers may be used with the invention, and the description and figures of the dispenser 10 are not to be limiting. The dispenser 10 of the present invention generally includes a housing 12. A fluid supply source is operatively connected to a fluid inlet 14. Preferably, the fluid used in the dispenser is water, but other liquids, gases or even solids and solid-liquid mixtures which behave in a fluid like manner may be used. The fluid supply source provides fluid to the dispenser 10 upon activation. Activation may be accomplished by an activation button 16 or other activation methods known in the art.

The dispenser 10 is configured to hold a solid product chemistry 18 that is combined with a fluid, such as water, to create a solution. For example, the solid product chemistry 18 is generally contained above a product support grate 20. Fluid may be supplied to the solid product chemistry 18 via a fluid supply line 22, known as the solid product line or puck line. The dispenser 10 works by having the fluid then interact with the solid product to form a solution having a desired concentration for its end use application. The fluid may be introduced to a bottom or other surface of the solid product. A make-up line may also be used to further increase dilution level as desired and enters the solution immediately above the discharge outlet 26 from the area around the thumb screw 24. Once the solution is created, the solution is discharged through the discharge outlet 26.

Figure 2:
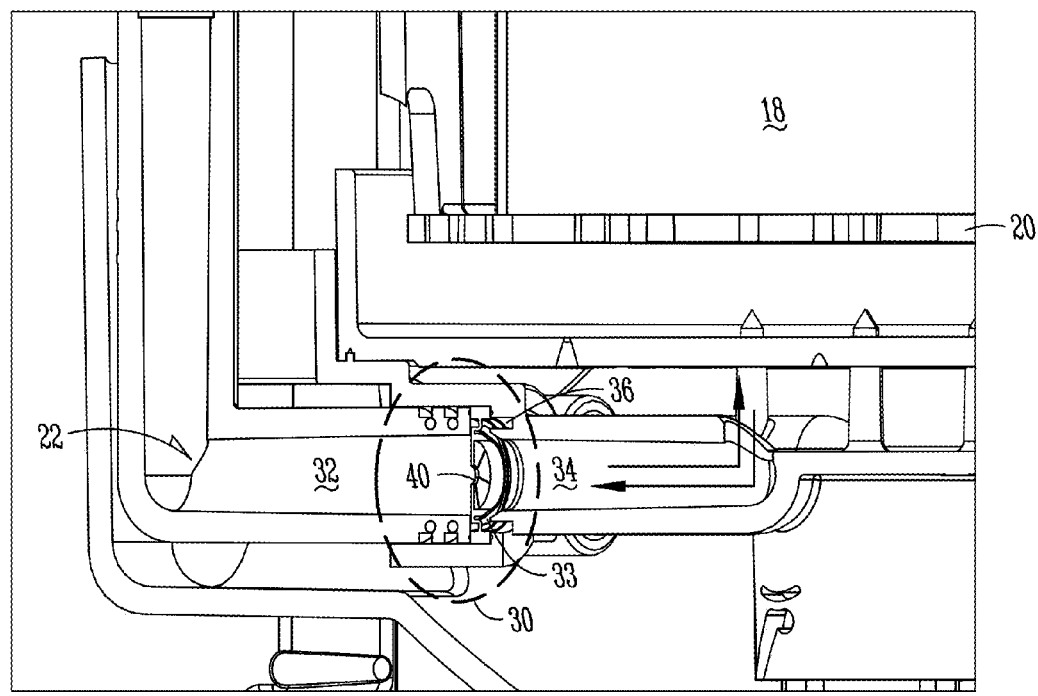
FIG. 2 is a close up view of a portion of the cross-sectional view of FIG. 1.

In a preferred embodiment of the present invention, the dispenser 10 includes a novel drainage component 30. One embodiment of the drainage component 30 is shown in FIG. 2. In this embodiment, the drainage component 30 is formed integrally with the downstream portion 34 of the supply line 22. The downstream portion or downstream supply line 34 is in fluid communication with the solid product chemistry 18. The upstream portion or inlet portion 32 of the fluid supply line 22 is in fluid communication with the fluid inlet 14.

The drainage component 30 includes a drain channel 36 in fluid communication with a drain 38. The drain 38 may be of any desired length and may be nothing more than the orifice allowing fluid to exit the drain channel 36. The drainage component 30 also includes an elastomeric element, preferably a single piece three-way elastomeric valve 40. An example of one embodiment of the single piece three-way elastomeric valve 40 of the present invention is shown in FIGS. 3-6. Preferably, the elastomeric valve 40 is formed through an injection molding process. The material used to form the elastomeric valve 40 should be flexible and able to withstand repeated exposure to the desired solution. For example, certain fluoroelastomers such as Viton® may be suitable for use where the valve 40 may be submerged in a concentrated chemical bath for approximately 30 seconds at a time. Other constructions may also be possible, such as using flexible metals in combination with o-rings, so long as the materials selected will perform as desired and are compatible with the desired chemistries.

Figure 3:
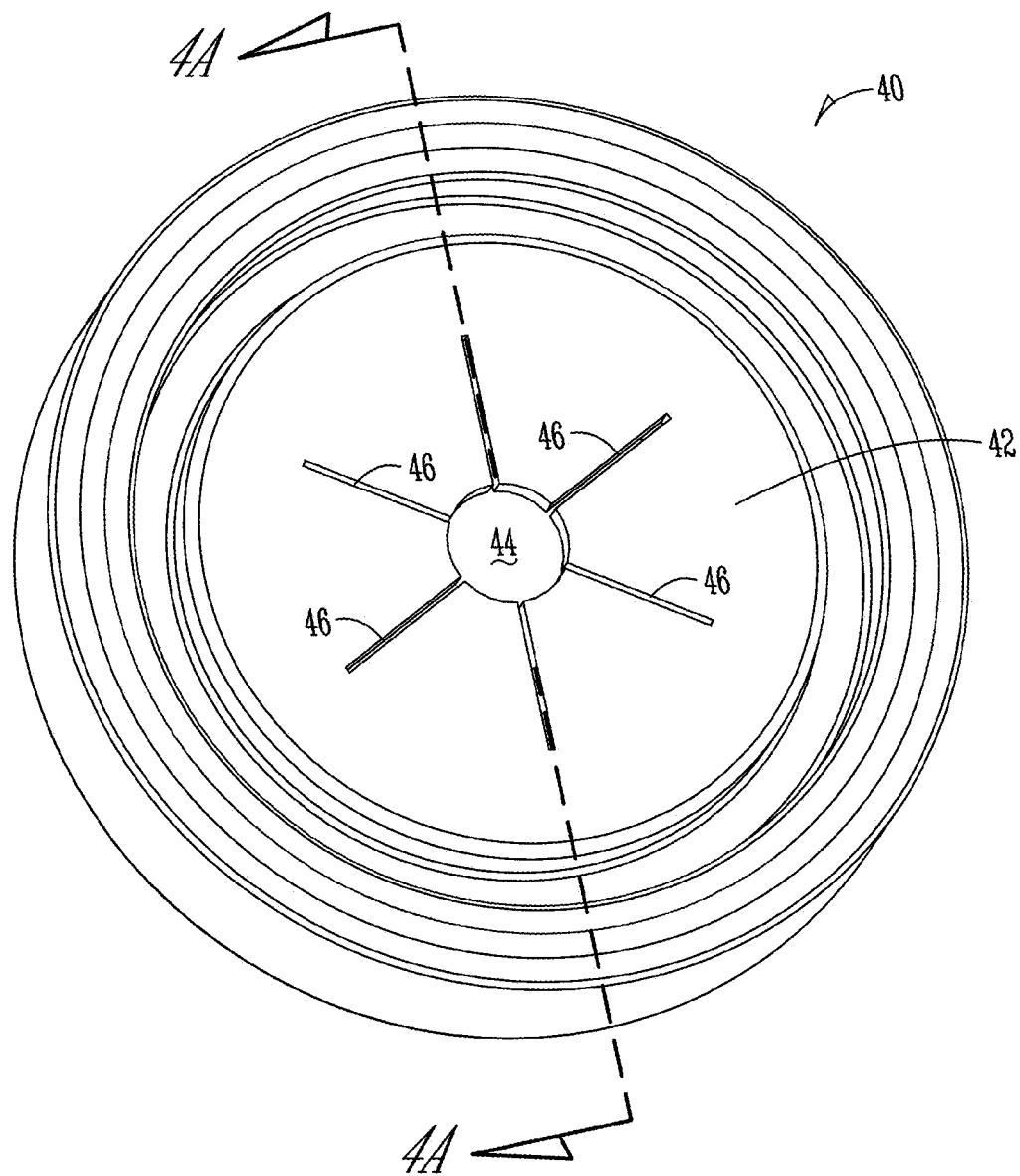
FIG. 3 is a perspective view of the front of an elastomeric valve according to an embodiment of the present invention for use in a dispenser such as shown in FIGS. 1 and 2.

As shown in FIG. 3, the preferred single piece three-way elastomeric valve 40 of the present invention includes a front face 42 which may include one or more orifices 44. As shown in FIG. 3, a single, centrally located orifice 44 is included to create a restriction where a pressure drop occurs. If desired, slits 46 or other shapes may be used as well. The use of slits 46 divides the front face 42 into wedge shaped sections, each of which can flex independently depending on flow conditions. This also allows for greater flexibility with increasing flow pressure and thus greater expansion of the orifice 44. A larger effective diameter allows fluid to pass through the orifice readily.

Figure 4A:
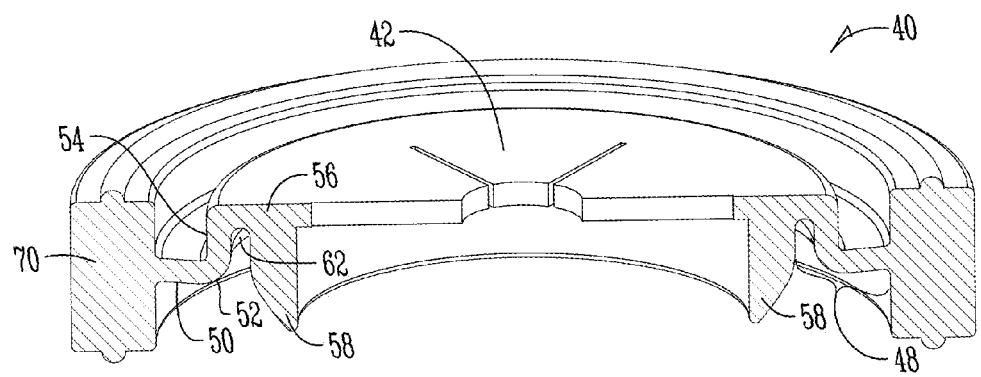
FIG. 4A is a cross-sectional view of the elastomeric valve of FIG. 3 in the open drainage position.

FIG. 4A shows a cross-sectional view of the embodiment shown in FIG. 3. In FIG. 4A, the valve 40 is shown as it would appear when there is no flow through the fluid supply line 32. The valve 40 as shown includes a front face 42 or first wall which includes the orifice 44 and any desired slits 46. This first wall is preferably connected to an outer placement flange 70 via a spring hinge 48. The spring hinge 48 preferably allows the valve 40 to close the drain channel 38 with a minimal amount of applied pressure.

Going from the outside towards the center of the valve 40, the spring hinge 48 preferably includes an initial arm 50. The initial arm 50 is generally vertical, but is preferably angled in a downstream direction to reduce certain stresses. A first bend 52, preferably at approximately a right angle, follows to turn the hinge wall upstream. This creates a generally horizontal arm 54. A second bend 56, again preferably at approximately a right angle turns the hinge wall further inward and into the front face 42.

Figure 4B:
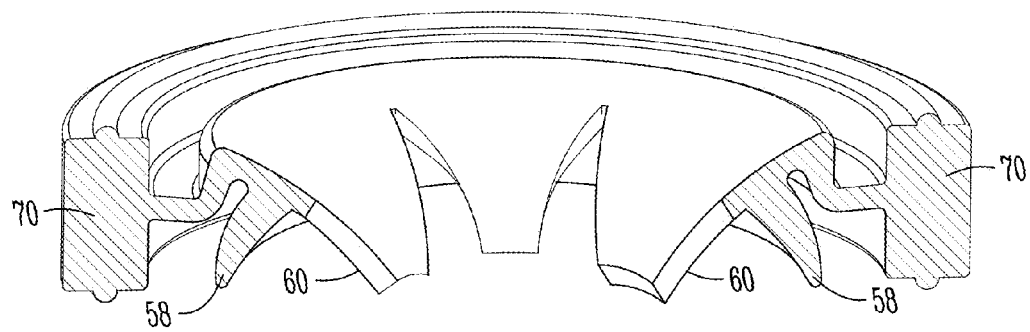
FIG. 4B is a cross-sectional view of the elastomeric valve of FIG. 3 in the sealed position.

A second wall 58 is formed on the rear face 60 of the valve 40. This second wall 58 extends further downstream and away from the rear face 60. There is thus a gap 62 formed between the second wall 58 and the generally horizontal arm 54. As the flow rate increases the size of the gap 62 will vary. Such an arrangement allows for the hinge 48 to move out of the way of the second wall 58's travel as shown in FIG. 4B.

Figure 5:
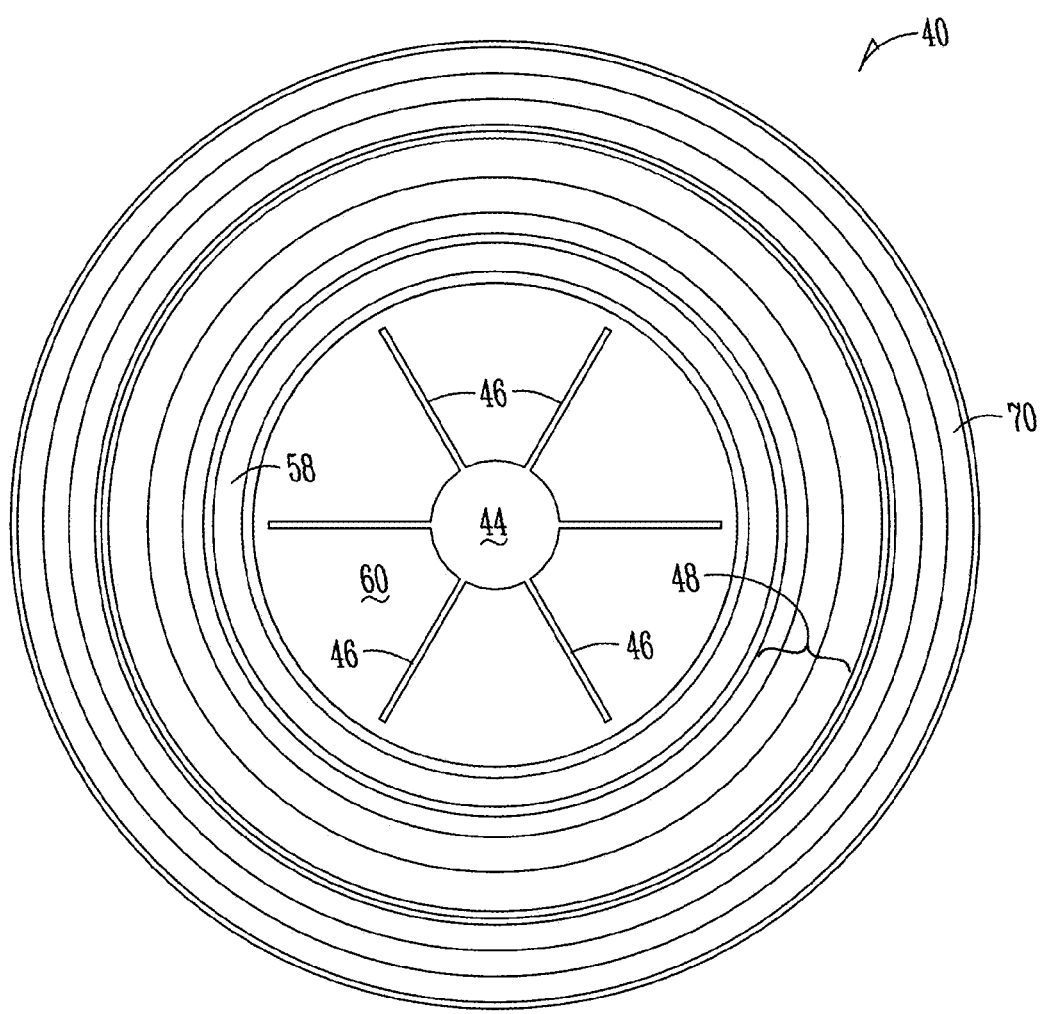
FIG. 5 is a rear view of the elastomeric valve of FIG. 3.
Figure 6:
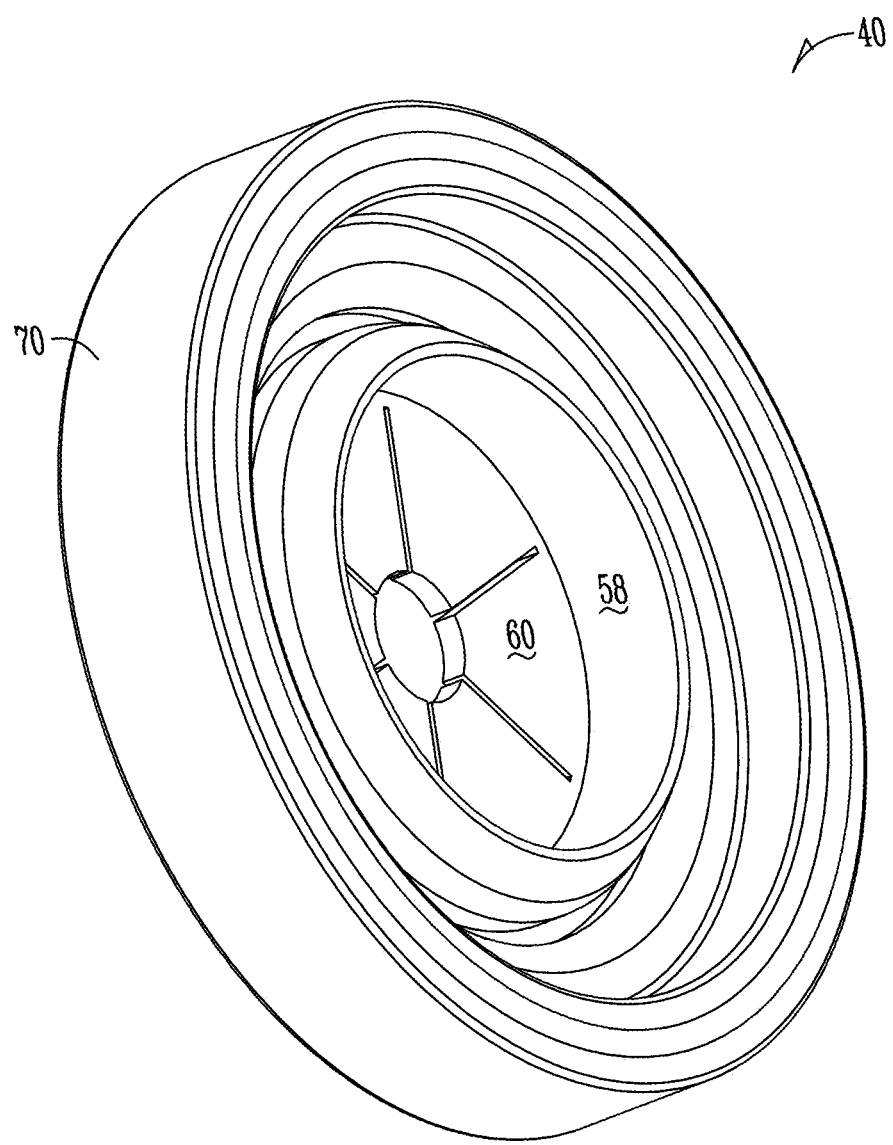
FIG. 6 is a perspective view of the rear of the elastomeric valve of FIG. 3.
Figure 7:
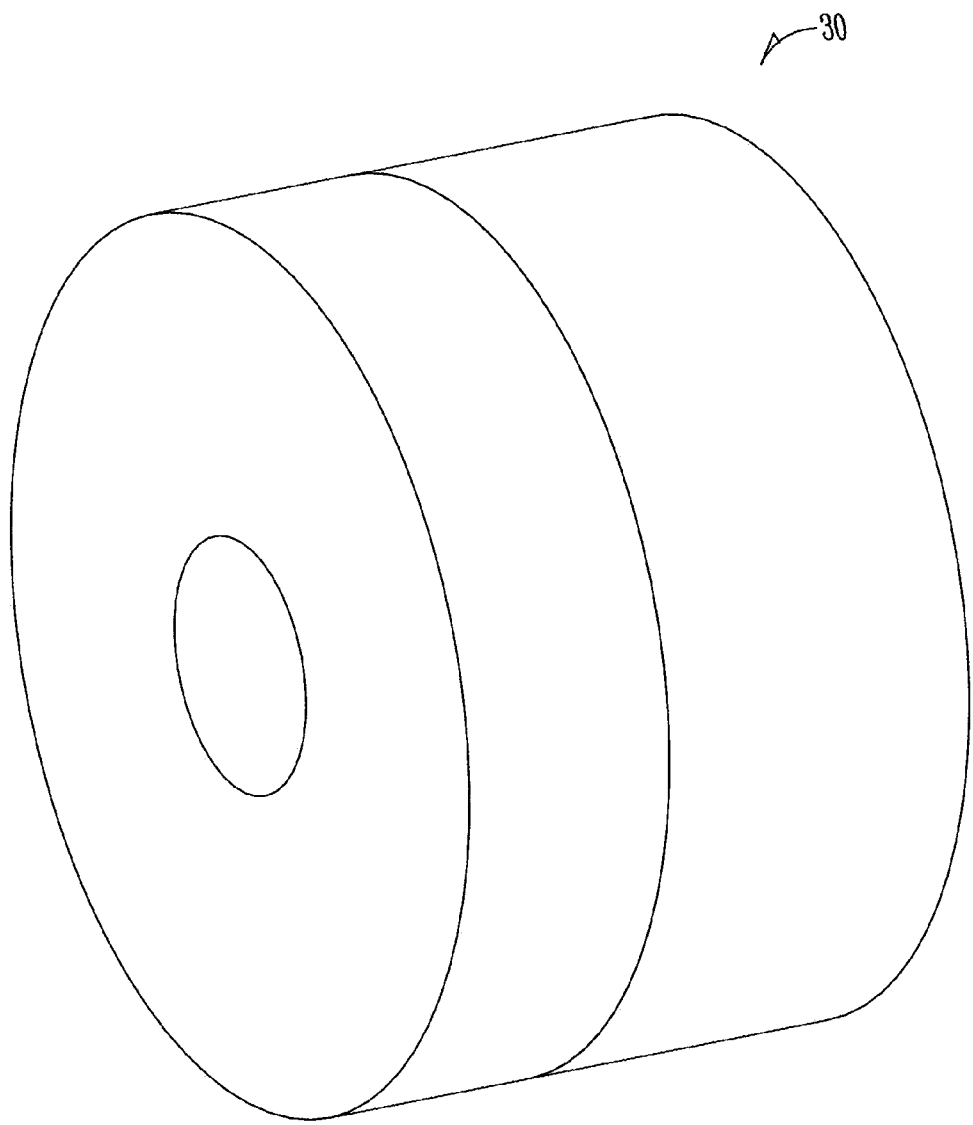
FIG. 7 is a perspective view of a drainage component according to an embodiment of the present invention.

As can be seen in FIGS. 5 and 6, the valve 40 is preferably generally a continuous ring. Thus, installation orientation is generally not an issue. The valve 40 preferably fits snugly into a corresponding plastic feature set. Preferably, the corresponding plastic feature set has tapered walls to align the valve properly even with varying installation orientation. Alternatively, the valve 40 can be secured in a desired location through an over-molding process. Over-molding is a well understood injection molding process where to materials are molded together. Preferably, an insert over-molding process is used where one portion of the supply line 22, either the inlet portion 32 or the downstream portion 34, are placed into a mold with the valve 40. The mold is closed and the other portion of the supply line 22 is then formed to secure the valve 40 in proper location. When pressure from the fluid flow is removed, a combination of residual stresses in the part and backpressure from the system force the valve 40 back to its original position as shown in FIG. 4A, thus opening the drain.

Figure 8:
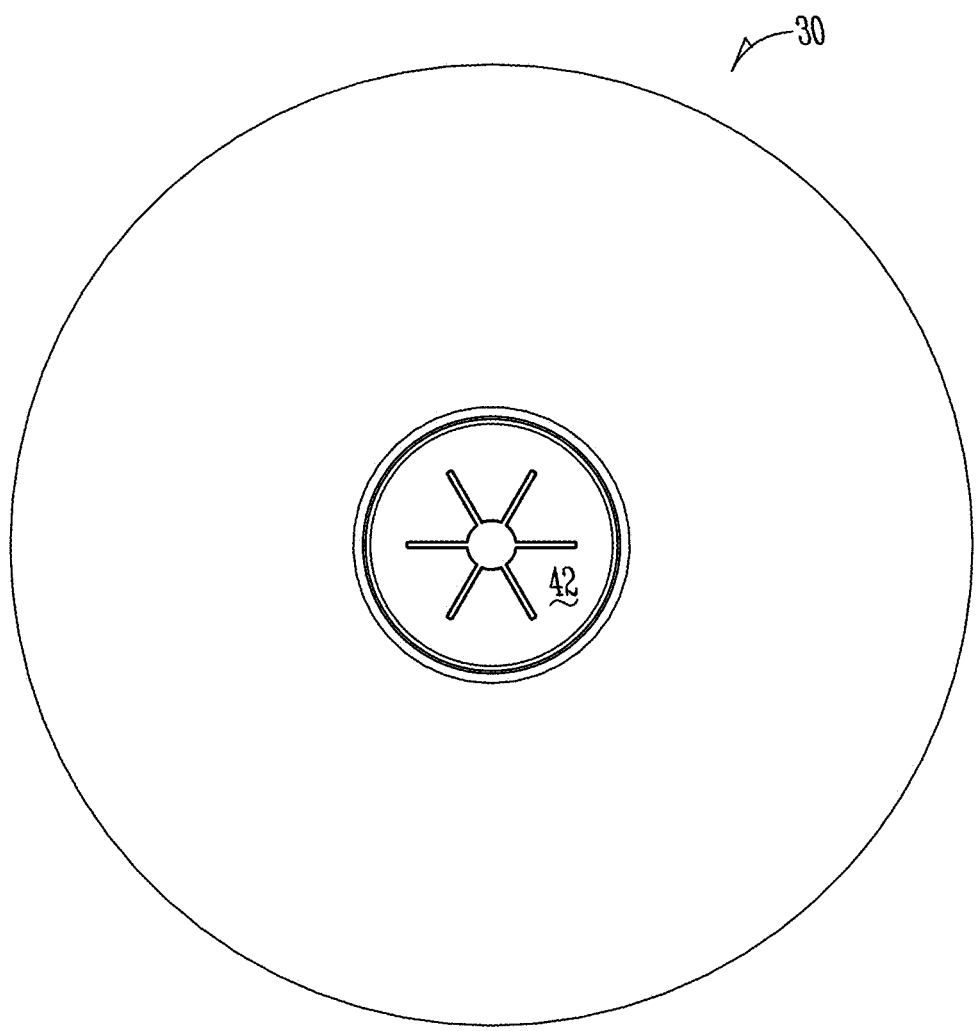
FIG. 8 is a front view of the drainage component of FIG. 7.
Figure 9:
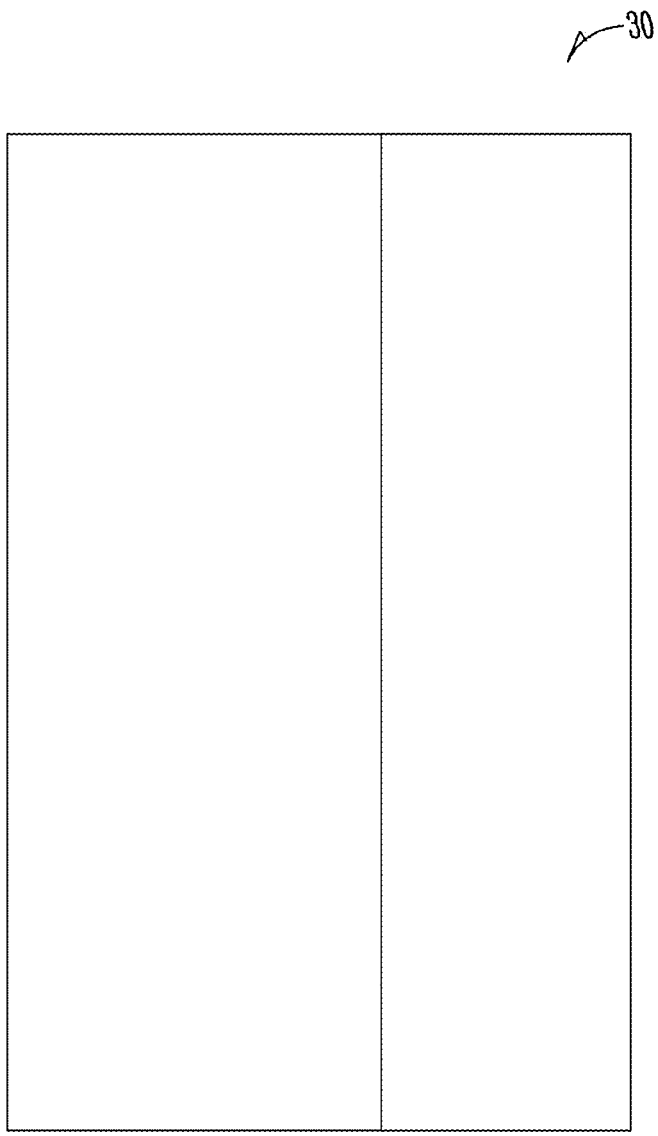
FIG. 9 is a side view of the drainage component of FIG. 7.
Figure 10:
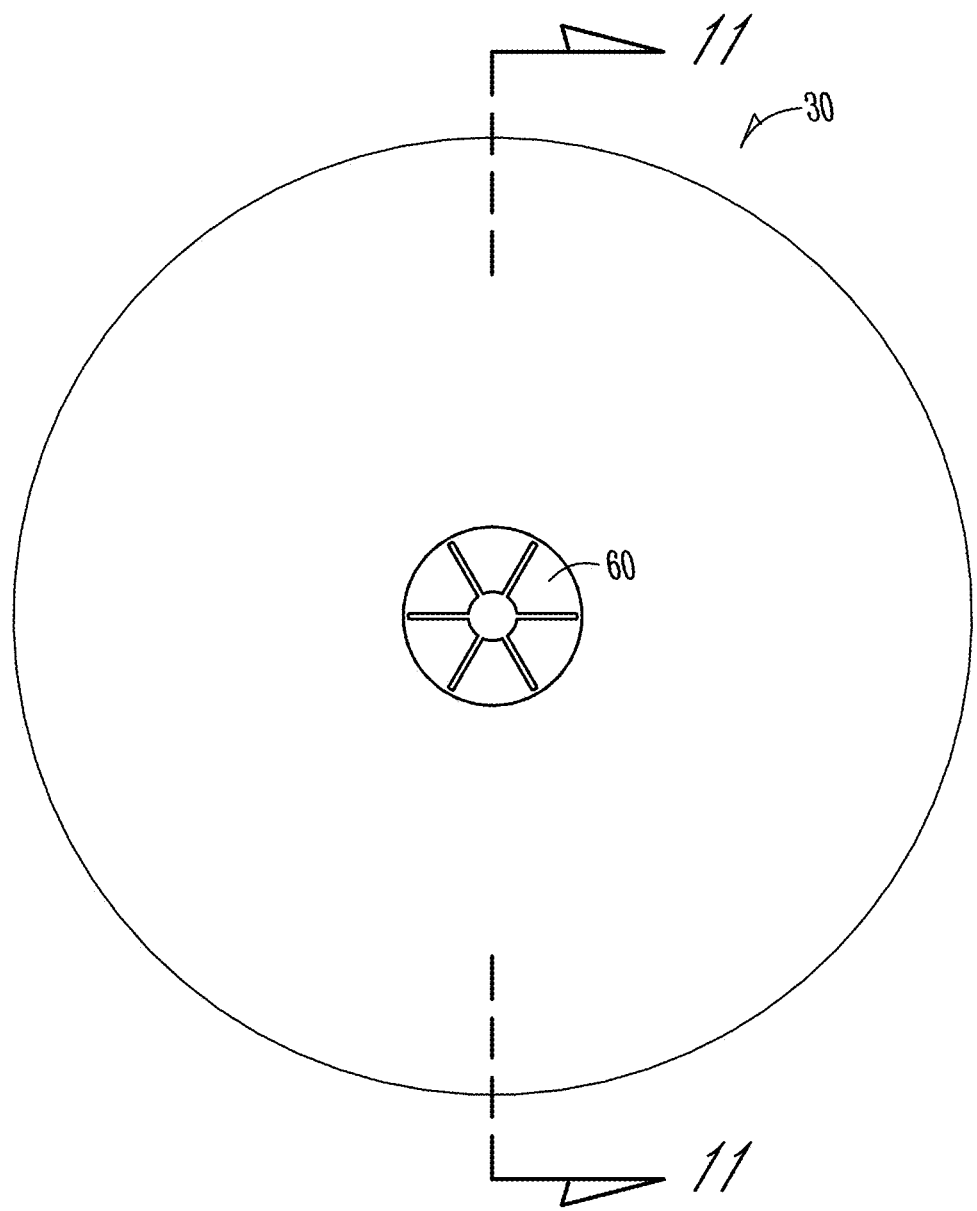
FIG. 10 is a rear view of the drainage component of FIG. 7.

FIGS. 7-11B show the drainage component 30 as a separate component. In this embodiment, the drainage component 30 is installed between the supply line 32 and the downstream line 34 to form a complete supply line 22. As can be seen in FIGS. 8 and 10, the area of the valve face 42 exposed upstream is greater than the area of the valve face 60 exposed downstream. This allows for pressure differences to develop across the valve 40 and for the valve 40 to deflect as intended.

Figure 11A:
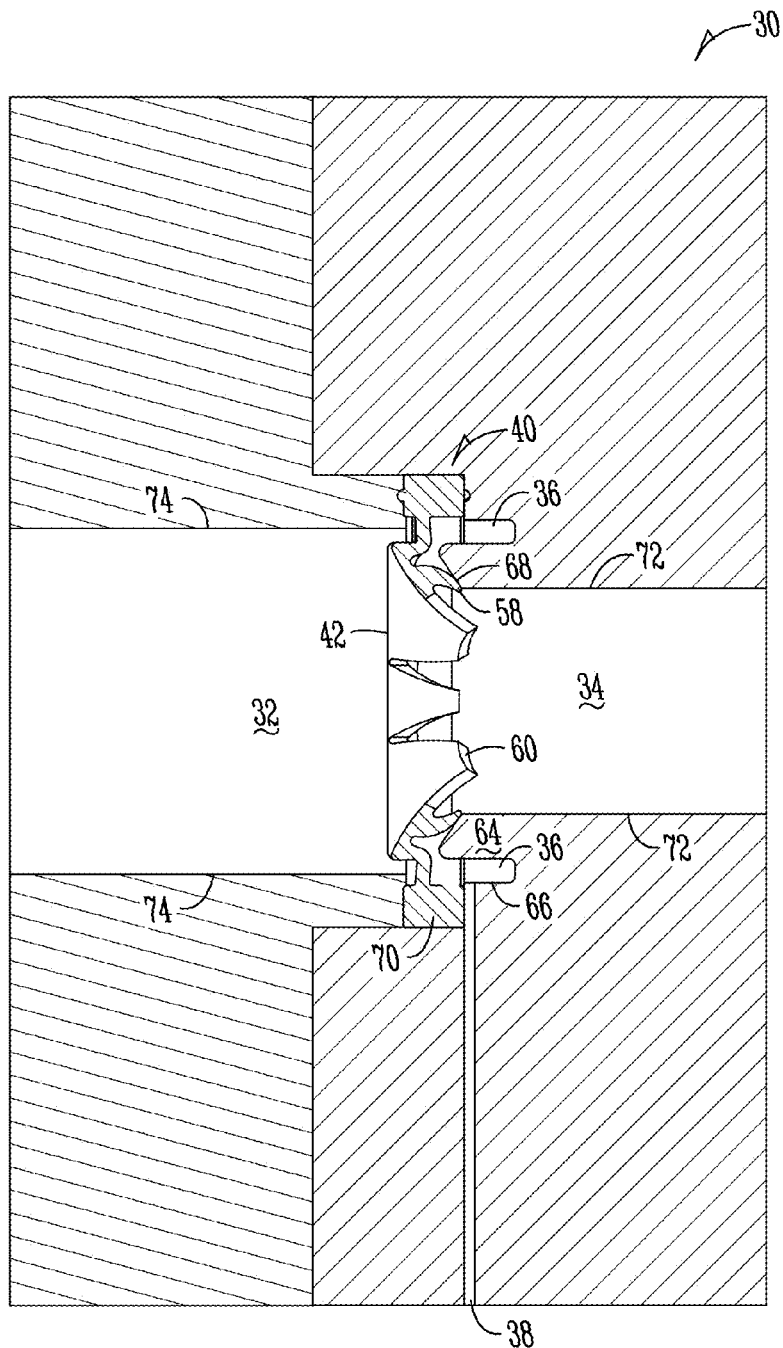
FIG. 11A is a cross sectional view of the drainage component of FIG. 7 in a first position.
Figure 11B:
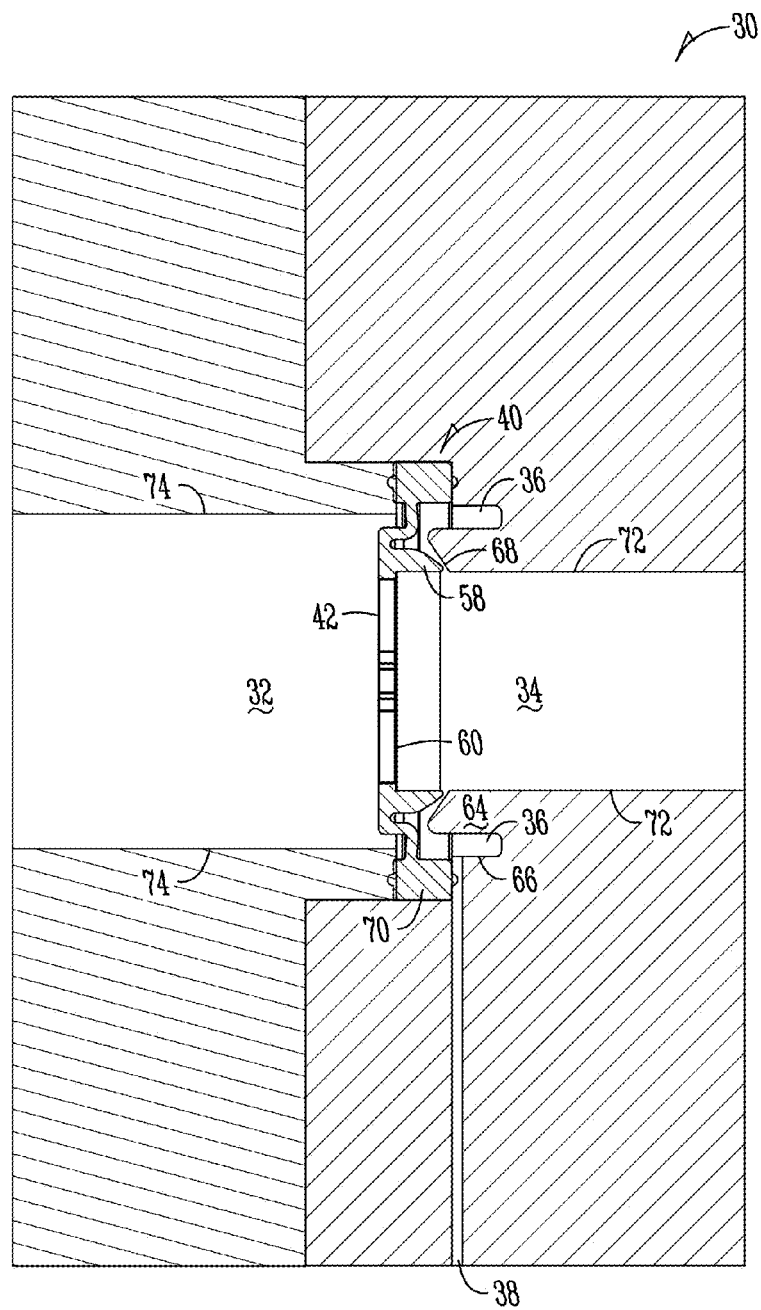
FIG. 11B is a cross sectional view of the drainage component of FIG. 7 in a second position.

As shown in FIGS. 11A and 11B, the valve 40 is secured between two sections of the drainage component 30. These two sections are generally secured together using glue, screws or any other acceptable connection means. When the fluid is flowing through the valve 40, as shown in FIG. 11A, the valve 40 is in a first position. In this first position, the second wall 58 contacts the sealing surface 68 of the inner wall 64. When the fluid is not flowing through the valve 40, as shown in FIG. 11B, the second wall 58 of the valve 40 does not contact the sealing surface 68 of the inner wall 64 of the drain channel 36. As discussed above, this allows excess solution to travel freely into the drain channel 36 and through one or more holes 38 in the outer wall of the drainage component 30.

To aid in installation the walls 72 and 74 of the drainage component 30 are tapered to narrow slightly toward the valve 40. This allows for a tight fit during installation of the drainage component 30 between the inlet portion 32 and the downstream portion 34.

Figure 12:
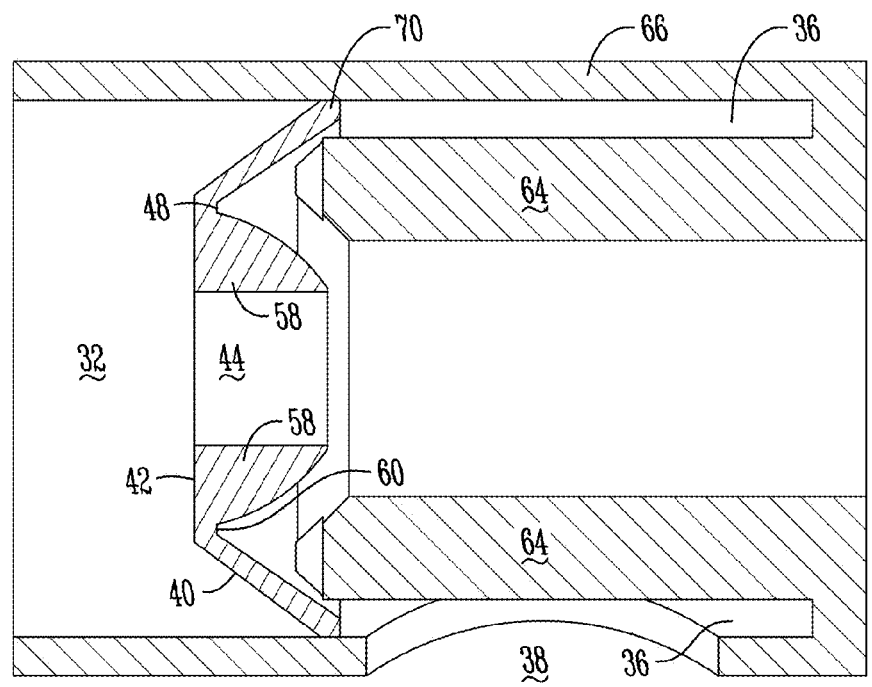
FIG. 12 is a cross sectional view of another embodiment of the present invention shown in the open drainage position.
Figure 13:
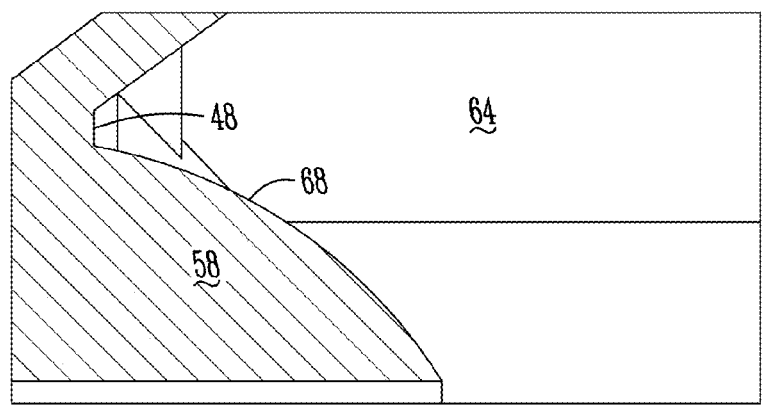
FIG. 13 is a close up of portion of the embodiment shown in FIG. 12 in the sealed position.

FIGS. 12 and 13 show another embodiment of the valve 40 and drainage component 30. In this embodiment, the drainage component is integrated with the connection between the inlet portion 32 and connected to the downstream portion 34. In this alternative embodiment, the shape of the spring hinge 48 is simplified and the size of the orifice 44 is increased. This allows for easier manufacturing processes. FIG. 12 shows the valve 40 in its open and draining position. FIG. 13 is a close up view of the second wall 58 of the valve 40 in this embodiment in its closed and sealing position where the outer edge of the second wall 58 is in contact with the sealing portion 68 of the inner wall 64 of the drainage channel 36.

The foregoing description has been presented for purposes of illustration and description, and is not intended to be an exhaustive list or to limit the invention to the precise forms disclosed. It is contemplated that other alternative embodiments or processes obvious to those skilled in the art are to be considered in the invention. For example, while hole shapes have been shown in various embodiments of the present invention, these are not the only configurations allowed.

What is claimed is:

1. An apparatus for controlling the flow of a fluid, the apparatus comprising:
   a fluid supply source;
   a fluid supply line in communication with the fluid supply source, wherein the fluid supply through the fluid supply line can be turned on or off;
   a downstream supply line;
   a single piece three-way elastomeric valve secured ahead of the downstream supply line, the elastomeric valve including:
   a moveable first wall, the moveable first wall having a first position when the fluid supply is on and a second position when fluid supply is off;
   a second wall connected to the moveable first wall and configured to movably engage a drain sealing surface in response to the moveable first wall moving from the second position to the first position;
   a drain in fluid communication with the downstream supply line when the moveable first wall of the elastomeric valve is in the second position.

2. The apparatus for controlling the flow of a fluid of claim 1 wherein the single piece three-way elastomeric valve includes an outer flange portion and a hinge portion between the outer flange portion and the second wall.

3. The apparatus for controlling the flow of a fluid of claim 2 wherein the hinge portion further comprises a first bend intermediate an initial arm and a horizontal arm, wherein the first bend approximates a right angle when the moveable first wall is in the second position.

4. The apparatus for controlling the flow of a fluid of claim 2 wherein the second wall and the outer flange portion are substantially concentric when the moveable first wall is in the second position.

5. The apparatus for controlling the flow of a fluid of claim 2 wherein the hinge portion includes a gap having a size that varies based, at least in part, on flow rate of the fluid.

6. The apparatus of claim 1 wherein the drain is at least one hole in fluid communication with the downstream supply line.

7. The apparatus of claim 1 wherein an area of a front face of the moveable first wall exposed to the fluid supply line is greater than an area of a rear face of the moveable first wall exposed to the downstream supply line.

8. The apparatus of claim 7 wherein the front face includes a plurality of wedge shaped sections configured to flex independently depending on flow conditions.

9. The apparatus of claim 1 wherein the drain is integral with one of the downstream supply line and the fluid supply line.

10. The apparatus of claim 1 wherein the drain is part of a drainage component which is connected to the fluid supply line and the downstream supply line.

11. A dispenser system for creating a solution by dissolving a solid product chemistry in a fluid, the dispenser system comprising:
    a dispenser housing;
    a fluid inlet connected to a fluid supply source;
    a product support grate;
    a solid product chemistry supported on the product support grate;
    a fluid supply line, the fluid supply line including an upstream portion in communication with the fluid inlet and a downstream portion supplying fluid towards the solid product chemistry, wherein the supplied fluid through the fluid supply line can be turned on or off; and
    a drainage component in fluid communication with the fluid supply line, the drainage component including:
    (a) a drain channel defined by an inner wall and an outer wall, the inner wall including a sealing surface;
    (b) a drain in fluid communication with the drain channel; and
    (c) a single piece three-way elastomeric valve having a moveable first wall and a second wall connected to the moveable first wall, wherein the moveable first wall has a first position when the fluid supply is on and a second position when fluid supply is off, and wherein the second wall is configured to movably engage a drain sealing surface in response to the moveable first wall moving from the second position to the first position.

12. The dispenser system of claim 11 wherein the elastomeric valve includes an orifice.

13. The dispenser system of claim 12 wherein the orifice includes a circular center portion and radially extending slots.

14. The dispenser system of claim 11 wherein the single piece three-way elastomeric valve has a hinge portion configured to flex and permit the second wall to movably engage the drain sealing surface.

15. The dispenser system of claim 11 wherein the elastomeric valve is comprised of a fluoroelastomer.

* * * * *